United States Patent [19]

Spencer et al.

[11] Patent Number: 4,770,729
[45] Date of Patent: Sep. 13, 1988

[54] METHOD OF MAKING A WELDED SLEEVE IDENTIFICATION

[75] Inventors: Donald W. Spencer, Monroe; Richard J. Buckwitz, Issaquah, both of Wash.

[73] Assignee: The Boeing Company, Seattle, Wash.

[21] Appl. No.: 887,520

[22] Filed: Jul. 21, 1986

[51] Int. Cl.$^4$ .................. B29C 65/08; B65C 3/02
[52] U.S. Cl. .................. 156/73.1; 156/86; 156/215; 156/256; 156/267; 156/277; 156/475; 156/580.1; 156/DIG. 6
[58] Field of Search .................. 156/73.1, 73.2, 85, 156/86, 488, 493, 580.1, 580.2, 215, 213, DIG. 6, 256, 267, 277, 475; 53/399, 557, 586, 590

[56] References Cited

U.S. PATENT DOCUMENTS

| | | | |
|---|---|---|---|
| 2,975,091 | 3/1961 | Tobey | 428/57 |
| 2,992,292 | 7/1961 | Brown | 174/112 |
| 3,459,878 | 8/1969 | Gressitt et al. | 174/112 |
| 3,491,507 | 1/1970 | Warfel | 156/85 |
| 3,650,059 | 3/1972 | Johnson | 40/316 |
| 3,894,731 | 7/1975 | Evans | 269/47 |
| 4,032,010 | 6/1977 | Evans | 206/345 |
| 4,199,884 | 4/1980 | Loof | 40/316 |
| 4,206,909 | 6/1980 | Wintle | 269/47 |
| 4,246,709 | 1/1981 | Selleslags | 40/2 |
| 4,300,284 | 11/1981 | Reeder | 29/860 |
| 4,361,230 | 11/1982 | Downing et al. | 206/345 |
| 4,379,009 | 4/1983 | Shibata et al. | 156/86 |
| 4,407,082 | 10/1983 | Stehouwer | 40/10 |
| 4,415,765 | 11/1983 | Iwasa et al. | 174/72 |
| 4,465,717 | 8/1984 | Crofts et al. | 428/40 |
| 4,570,422 | 2/1986 | Watanabe et al. | 53/557 |
| 4,665,679 | 5/1987 | Watanabe | 53/131 |

Primary Examiner—Michael Wityshyn
Attorney, Agent, or Firm—Christensen, O'Connor, Johnson & Kindness

[57] ABSTRACT

A method and apparatus for creating an identification sleeve on a thin, elongate object (35, 67, 113), such as a wire, pipe or ring, is disclosed. A printer (15, 65, 91) prints identification indicia on a strip of ultrasonically weldable heat shrinkable material (13, 63, 93). The strip is cut into flat pieces (13A, 63A, 93A), each of which contain identification indicia in a predetermined location, preferably at the center of the piece. The pieces are wrapped around the elongate object to be identified such that the indicia overlies the object and the longitudinal axis of the indicia lies generally parallel to the longitudinal axis of the object. The pieces (13A, 63A, 93A) are wrapped around the object such that the pieces take on a U-shaped configuration. The outwardly extending legs of the U-shaped pieces are ultrasonically welded together adjacent to the object and the excess portion of the legs are cut away. Then the thusly formed sleeve is positioned by sliding it along the object. After being positioned, the sleeve is heated, resulting in the sleeve material shrinking until it tightly grips the object.

5 Claims, 6 Drawing Sheets

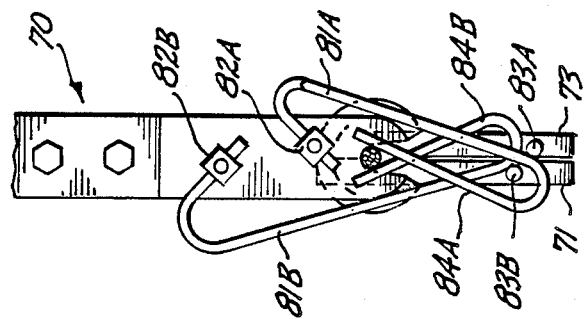
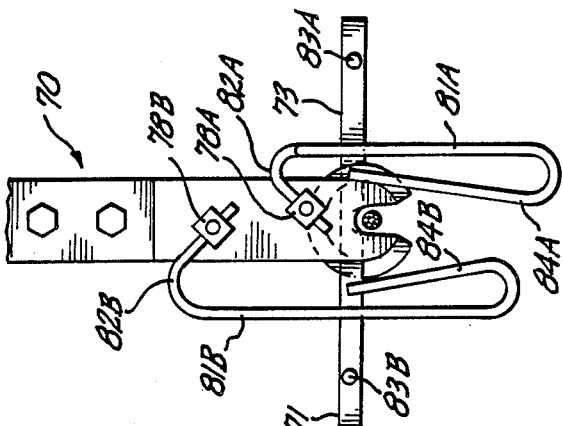
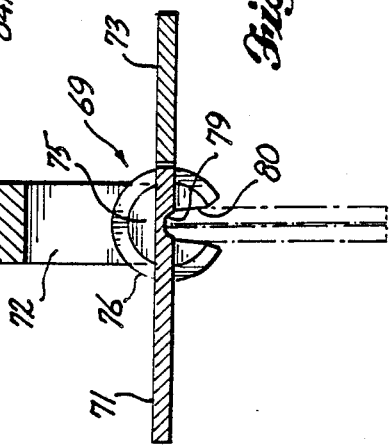
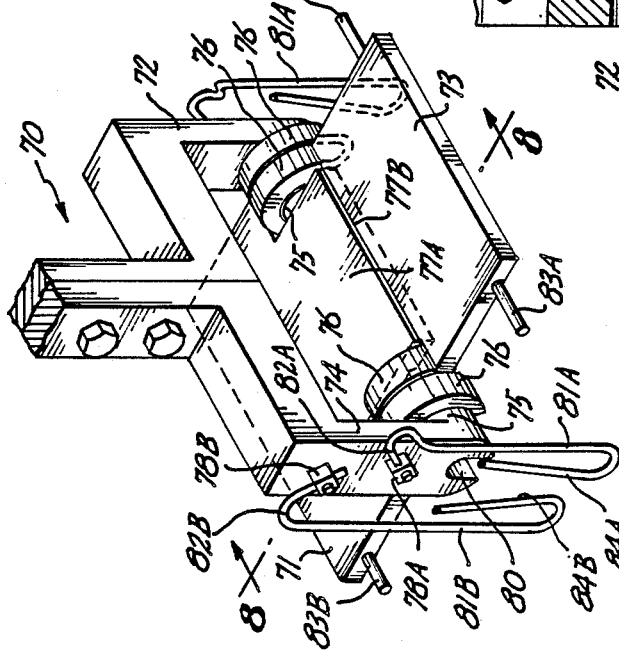

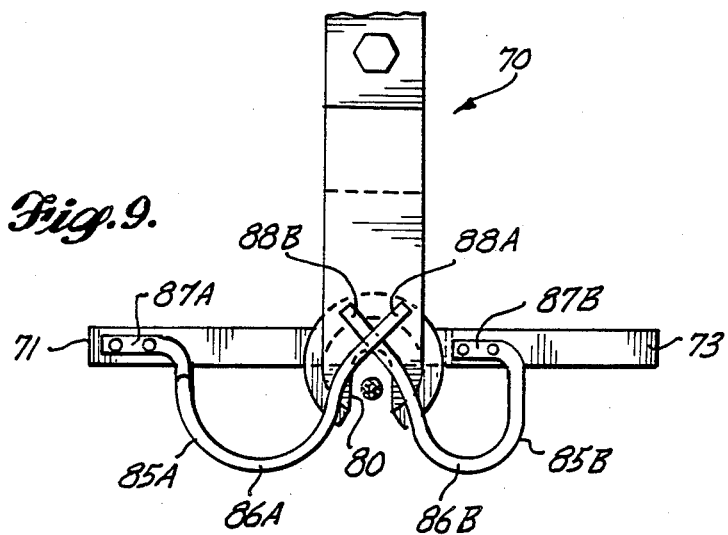
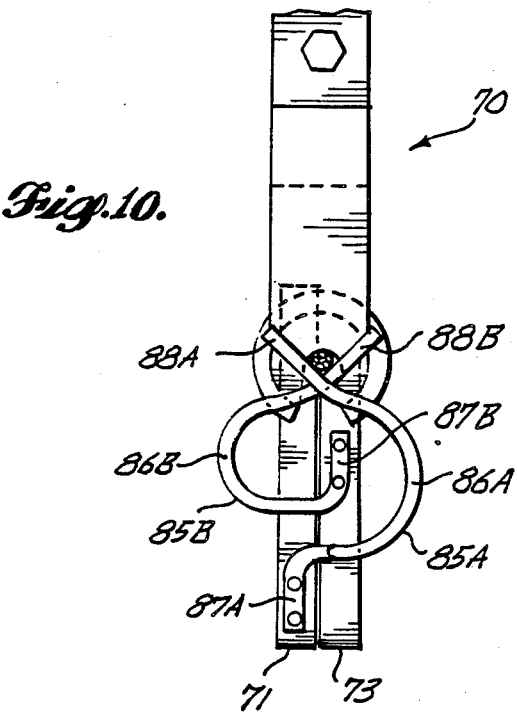

METHOD OF MAKING A WELDED SLEEVE IDENTIFICATION

TECHNICAL AREA

This invention is directed to methods and apparatus for identifying objects and, more particularly, methods and apparatus for identifying thin, elongate objects.

BACKGROUND OF THE INVENTION

Many manufacturing situations require that thin, elongate objects, such as wires, pipes and rings be identified. In communication and electric power distribution systems, wires must be identified so that related subsystems can be correctly connected together. In hydraulic and pneumatic systems, hydraulic and pneumatic conduits often must be identified so that correct couplings can be made. While simple color coding can be used in some systems, other systems require more sophisticated identification, namely indicia identification that is usually alphanumerically based.

In the past, various methods for applying an indicia identifier to elongate objects, such as wires and pipes, have been proposed and used. Prior methods range from printing or embossing indicia directly onto the surface of the wire or pipe to applying a tag to the elongate object. Both of these methods and the apparatus associated with the methods have disadvantages. Printing or embossing indicia is expensive and time consuming, and cannot be used in some systems. For example, it is difficult to emboss or print readable indicia on wire bundles, including twisted wire pairs. Embossed indicia also have the disadvantage of being difficult to read, particularly under low light conditions.

While applying indicia bearing tags to thin, elongate objects overcomes the disadvantages of printing and embossing indicia onto such objects, prior methods of tagging thin, elongate objects have other disadvantages. In general, prior tagging methods use two distinct types of tags—cylindrical tags and flat, wrap-around tags. Both tags have the disadvantage that they are preprinted. Thus, a user must select the correct tag, as well as install it. In many situations, such as the application of tags to wire harnesses to be used in aircraft, the selection criteria requires the services of a relatively skilled employee. In the past, preprinted tags have also had the disadvantage that the indicia to be printed must be known well in advance so that the tags can be printed well prior to when they are to be applied. This makes an automated tag applying system difficult to create since manual intervention would be required each time an out of sequence, nonregular or delayed indicia tag is required.

Cylindrical tags have the further disadvantage that it is difficult to print indicia on a cylindrical surface. Further, cylindrical tags must be inserted from one end of an elongate object and slid to the desired position. In many instances this is difficult and/or time consuming, if not impossible. While wrap-around tags avoid the printing and positioning problems of cylindrical tags, in the past, wrap-around tags have had a protruding tab that creates other disadvantages. Specifically, some elongate objects, wires in particular, are frequently pulled through small holes. Sometimes the holes are located in inaccessible, or difficult to access, locations. Protruding tabs formed of weak materials are likely to be torn off when wires are pulled through such holes. Protruding tabs formed of strong materials prevent wires from being pulled through such holes as a result of the tabs impinging on the structure surrounding the holes through which the wires are to pass. Further, in the past, wrap-around tags have usually been held together by an adhesive. Adhesives have several disadvantages. They are frequently unreliable in long service-life environments. Further, many adhesives loosen and separate at elevated temperatures, and when exposed to a variety of solvent and/or corrosive fluids.

As a result, there is a need for a method and apparatus for applying easily readable indicia to thin, elongate objects, particularly an inexpensive method and apparatus. The invention is directed to providing such a method and apparatus.

SUMMARY OF THE INVENTION

In accordance with this invention, a method and apparatus for creating an identification sleeve on thin, elongate objects, such as a wire, pipe or ring, is provided. The method comprises the steps of creating identification indicia on flat pieces of ultrasonically weldable, heat shrinkable material. The pieces are wrapped around the object to be identified such that the indicia and the object are aligned. As the pieces are wrapped around the object, they take on a U-shaped configuration. The outwardly extending legs of the U are ultrasonically welded together in the region adjacent to the object; and, the excess portion of the legs are removed. After the thusly formed sleeve is moved to the desired position, it is heated, resulting in the sleeve shrinking until the object is tightly gripped.

The apparatus of the invention comprises an indicia creating mechanism, such as a printer, for creating indicia on a flat piece of ultrasonically weldable, heat shrinkable material; and, a mechanism for wrapping the piece of material around a thin, elongate object such that the indicia overlies the object, welding the legs of the resulting U-shaped piece together to form a sleeve that encircles the object and, then, removing the excess portion of the outwardly extending legs of the welded piece.

Mechanisms formed in accordance with the invention for wrapping a piece of indicia bearing ultrasonically weldable, heat shrinkable material around a thin, elongate object, welding the material and removing excess material include a vacuum pad and related mechanism for picking up an imprinted piece and moving the piece to the thin, elongate object to receive the piece.

In one form of the invention, the piece is moved to a position above a vacuum mandrel. In this form, the vacuum pad is U-shaped and includes vacuum orifices on its inner surface, and the vacuum mandrel is wedge shaped and includes vacuum orifices on its outer surface. The thin, elongate object is located between the base of the vacuum pad and the apex of the vacuum mandrel. The pad is moved toward the mandrel, resulting in the piece of material being wrapped around the object. Then, vacuum is applied to the mandrel and released from the pad. As a result, the piece of material is transferred from the pad to the mandrel. Thereafter, the ultrasonically weldable, heat shrinkable material is welded along a line lying parallel to the axis of the thin, elongate object and between the object and the apex of the vacuum mandrel. Then, a knife mechanism is actuated to remove the excess portion of the legs of the resulting object-encircling tag.

In an alternative form of the invention, the vacuum pad is double leaved and hinged. The flat pieces of indicia bearing material are picked up when the hinged vacuum pad is flat and vacuum is drawn through orifices located in the pick up surface of the pad. The vacuum pad and the indicia bearing strips are moved to the elongate object to receive the indicia bearing piece of material and positioned such that the longitudinal axis of the object lies parallel and adjacent to the hinge line. The leaves of the hinged pad are then rotated about their hinge line, resulting in the piece of material being wrapped around the object. Thereafter, an ultrasonic welding mechanism welds the legs of the now U-shaped piece of material together; and, a cutting mechanism cuts off the excess portion of the legs.

In another form of the invention, the imprinted piece of ultrasonically weldable, heat shrinkable material is received by a vacuum holder. The vacuum holder is rotatable through 90° to face a sizing wheel, which forms the vaccum pad. The sizing wheel includes a plurality of surfaces, each of which includes a semicircular indentation of different size. The surface of the sizing wheel containing the appropriately sized indentation faces the holder when the holder is in its 90° rotated position. The surfaces of the sizing wheel include vacuum orifices that are evacuated to hold the piece of indicia bearing material, as the vacuum applied to the holder is released. After receiving the indicia imprinted piece of material, the sizing wheel is moved and rotated so that the indicia bearing piece of material faces the thin, elongate object. Positioning is such that the longitudinal axis of the object lies parallel to the longitudinal axis of the indentation in the sizing wheel covered by the piece of material. Thereafter, the object and the sizing wheel are moved relative to one another such that the object presses the piece of indicia bearing material into the semicircular indentation. Then an ultrasonic welding mechanism welds the outwardly extending legs of the piece of material together and a cutter cuts away the excess portion of the legs.

As will be readily appreciated from the foregoing description, the invention provides a method and apparatus for applying an identification sleeve to a thin, elongate object, such as a wire, pipe or ring. Because the sleeve begins as a flat piece of material, it can be readily imprinted with indicia such as an alphanumeric identifier, or a symbol. Because the piece of imprinted material is wrapped around the sheath prior to being welded to form a sleeve, it can be applied at any position along the length of the elongate object. Further, it can be readily applied to noncylindrical, elongate objects, such as bundles of wires, including twisted wire pairs as well as continuous objects, such as rings. After being applied, the piece can be readily slid to a desired, nearby position. Becuase the imprinted piece is formed of a heat shrinkable material, after being positioned, it can be heated to activate the heat shrinking aspect of the material and "lock" the piece in position. Also, because the indicia are printed just prior to being applied, a highly versatile method and apparatus is provided by the invention. Relatively unskilled workers can be used to apply indicia since the indicia bearing pieces are applied immediately after being created. Also there need be no sequential indicia relationship between sequentially produced indicia bearing pieces of material. Thus, the invention is ideally suited to form part of an automated system for creating, for example, indicia bearing wire harnesses for aircraft. Alternatively, the mechanism for picking up, moving and applying pieces of indicia bearing material can be embodied in a hand held unit.

BRIEF DESCRIPTION OF THE DRAWINGS

The foregoing and other features and advantages of the present invention will become more readily appreciated as the same becomes better understood by reference to the following detailed description when taken in conjunction with the accompanying drawings wherein:

FIG. 6 is an enlarged view of the portion of the apparatus illustrated in FIG. 5 for picking up, moving and applying a piece of indicia bearing material;

FIG. 7A and 7B are sequence views illustrating the operation of the pickup, moving and applying apparatus shown in FIG. 6;

FIG. 8 is a cross-sectional view of FIG. 6 along line 8—8;

FIG. 9 is an end view of an alternative embodiment of a spring mechanism suitable for use with the apparatus illustrated in FIGS. 6–8 in the open position;

FIG. 10 is an end view similar to FIG. 9 showing the spring mechanism in the closed position;

DESCRIPTION OF THE PREFERRED EMBODIMENTS

The present invention is directed to a method and apparatus for applying an identification sleeve to thin, elongate objects, such as wire, pipe, cable, rope, etc. The object may have ends or be endless—a ring, for example. The method of the invention comprises the steps of: printing identification indicia on a flat piece of ultrasonically weldable, heat shrinkable material; wrapping the piece around the object to be identified such that the indicia and the object are aligned and the piece becomes U-shaped; ultrasonically welding the legs of the U-shaped piece together adjacent the object; and, removing excess leg material. After the thusly shaped sleeve is formed, it is slid to the desired position and heated to activate the shrinking capability of the material. As a result, the sleeve tightly grips the object.

FIGS. 1–4 illustrate an embodiment of an apparatus formed in accordance with the invention for carrying out the method of the invention. The apparatus illustrated in FIGS. 1–4 includes a spool 11 of ultrasonically weldable, heat shrinkable material 13. The spool 11 is supported for rotation by a U-shaped support bracket 14. More specifically, the support bracket 14 supports a shaft 16 on which the spool 11 is mounted.

Figure 4:
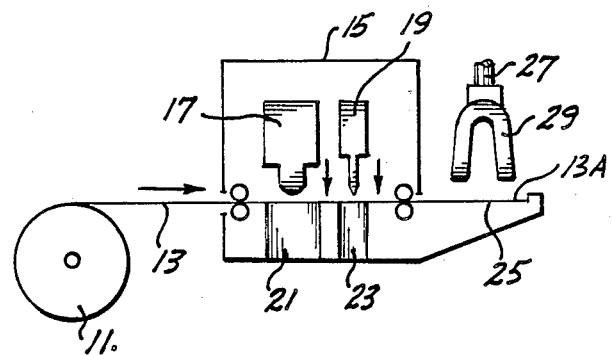
FIG. 4 is a schematic diagram illustrating the printing portion of the apparatus illustrated in FIG. 1.

After leaving the spool 11, the strip of ultrasonically weldable, heat shrinkable material 13 enters a printer and severing mechanism 15. FIG. 4 is a schematic diagram illustrating the main elements of the printer and severing mechanism 15. As illustrated in FIG. 4, the printer and severing mechanism 15 includes a print head 17 and a knife 19 located on one side of the strip of ultrasonically weldable, heat shrinkable material 13. Located on the other side of the material 13 in alignment with the print head 17 is a platen 21. Located on the other side of the material 13 from the knife 19 is a block 23. Since the form of the print head is not critical to the invention and since a wide variety of print mechanisms well known to those skilled in the print arts can be used in embodiments of the invention, no specific print mechanism is disclosed. In this regard, the print mechanism may be an ink ribbon printer, a thermal printer or an ink jet printer, for example. Further, the printer can be a character printer or a dot matrix printer. While, preferably, the printer prints alphanumeric characters on the strip of ultrasonically weldable, heat shrinkable material, if desired, symbols can be printed on the material.

As illustrated in FIG. 4, after passing between the print head 17 and the platen 21, the strip of ultrasonically weldable, heat shrinkable material 13 passes between the knife 19 and the block 23. Actuation of the knife 19 severs the material 13. As a result, pieces of ultrasonically weldable, heat shrinkable indicia bearing material are created.

While, preferably, the axis of printing lies transverse to the longitudinal axis of the strip of ultrasonically weldable, heat shrinkable material, if desired, the print axis could lie parallel to the longitudinal axis of the strip. In either case, preferably, the axis of the print row or rows lies equal distance from the parallel edges of the strip. Thus, the indicia is centered. Indicia centering is preferred so that when a piece of indicia bearing material is wrapped around a thin, elongate object in the manner hereinafter described, the resulting U-shaped piece has legs of equal length. While indicia centering is preferred, other indicia locations can be utilized as long as the portion of the material that encircles the thin, elongate object contains the indicia.

After a piece of indicia bearing material is severed from the strip of ultrasonically weldable, heat shrinkable material 13, it is ejected from the printer and severing mechanism 15 onto a horizontal platform 25. Ejected pieces 13A are picked up and moved from the horizontal platform 25 by a multiple joint arm 27 having a U-shaped vacuum pad 29 mounted on one end. A plurality of orifices are located on the inner surface of the U-shaped vacuum pad 29. The orifices are connected to a vacuum source (not shown) through conduits that pass through the arm 27.

After being positioned above an indicia bearing piece of material 13A supported by the horizontal platform 25, vacuum is drawn on the U-shaped pad 29, resulting in the indicia bearing piece of material 13A being sucked into and pulled against the inner surface of the U-shaped pad 29. Since the indicia is printed on the upper surface of the ejected piece of indicia bearing material 13A, the indicia region 33 faces the U-shaped pad 29. The U-shaped pad 29 is positioned such that when the piece of indicia bearing material 13A is drawn into the pad, the indicia region 33 lies in the curved end of the pad.

Figures 1, 2, 3:
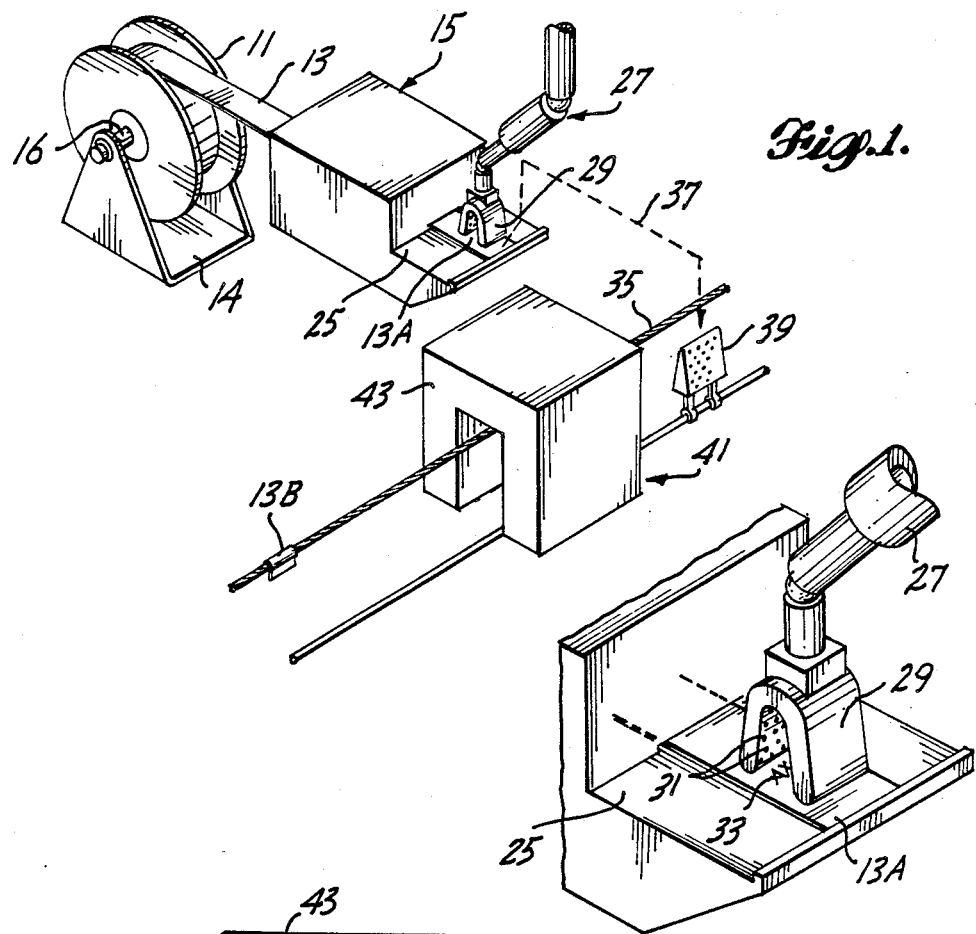
FIG. 1 is a pictorial diagram of an embodiment of an apparatus formed in accordance with the invention.
FIG. 2 is an enlarged view of the portion of the apparatus illustrated in FIG. 1 for picking up and moving a piece of indicia bearing material.
FIG. 3 is an enlarged view of the portion of the apparatus illustrated in FIG. 1 for ultrasonically welding a piece of indicia bearing material wrapped around a thin, elongate object and cutting off excess leg material.

After the indicia bearing piece of material 13A has been picked up by the U-shaped pad 29 in the manner just described, the arm 27 is actuated to move the U-shaped pad 29 and the indicia bearing piece of material 13A to a position above the thin, elongate object that is to receive the piece of material. The thin, elongate object is illustrated in FIG. 1 as a wire 35. The path of travel followed by the indicia bearing piece of material 13A is illustrated in FIG. 1 by dashed line 37.

Located on the opposite side of the wire 35 from the U-shaped vacuum pad 29 is a wedge-shaped vacuum mandrel 39. Preferably, the wire 35 is horizontally oriented and the wedge-shaped vacuum mandrel lies below the object. In any event, the apex of the wedge-shaped vacuum mandrel 39 lies parallel to the longitudinal axis of the wire 35. Further, the wedge angle of the wedge-shaped vacuum mandrel 39 is sized to allow the wedge-shaped vacuum mandrel to fit between the legs of the U-shaped vacuum pad 29 when the wedge-shaped vacuum mandrel is positioned therebetween. When in this position, the curved portion of the piece of material held by the U-shaped vacuum pad surrounds the wire and is juxtaposed against the wedge surfaces of the wedge-shaped vacuum mandrel. When this position is reached, vacuum is applied to the wedge-shaped vacuum mandrel 39 and released or withdrawn from the U-shaped vacuum pad 29. As a result, the piece of indicia bearing material 13A is released by the U-shaped vacuum pad 29 and becomes attached to the wedge-shaped vacuum mandrel 39. Thereafter, the U-shaped vacuum pad 29 is returned to a position above the horizontal platform 25, ready to pick up the next piece of indicia bearing material.

After a piece of indicia bearing material 13A is delivered to the wedge-shaped vacuum mandrel 39 in the manner just described, the wire 35, the partially encircling piece of indicia bearing material 13A and the wedge-shaped mandrel 39 are moved to an ultrasonic welding mechanism 41. Alternatively, the ultrasonic welding mechanism may be moved to the object, the indicia bearing piece of material and the vacuum mandrel.

The illustrated ultrasonic welding mechanism 41 includes an inverted U-shaped housing 43. As shown in FIG. 3, mounted in the housing 43 is an elongate ultrasonic horn 45 and an anvil 47. When the wire 35, the piece of indicia bearing material 13A, and the wedge-shaped mandrel 39 are suitably positioned in the housing 43, the ultrasonic horn 45 lies on one side of legs 51A and 51B of the U-shaped piece of indicia bearing material and an elongate protrusion 49 formed in the adjacent surface of the anvil 47 lies on the other side of the legs. The longitudinal axis of the elongate horn 45 and the longitudinal axis of the elongate protrusion 49 lie parallel to one another and parallel to the wire, between the wire 35 and the apex of the wedge-shaped mandrel 39.

After the wire 35, the piece of indicia bearing material 13A and the wedge-shaped mandrel 39 are positioned between the elongate horn 45 and the elongate protrusion 49, the ultrasonic horn 45 and the anvil 47 are moved toward one another (if necessary) for ultrasonic welding to take place. Thereafter, an ultrasonic generator (not shown) attached to the ultrasonic horn 45 is energized, resulting in the legs 51A and 51B of the indicia bearing piece of material 13A being welded together. Next, a knife blade 53, positioned beneath the ultrasonic horn 45, is actuated to sever the legs 51A and 51B from the sleeve portion of the indicia bearing piece of material 13A that now surrounds the wire 35. Then the wire 35 is moved longitudinally out of the ultrasonic welding mechanism 43, or the ultrasonic welding mechanism is moved away from the wire.

As will be readily appreciated from the foregoing description, as shown on the left side of FIG. 1, at the end of the described sequence, an indicia bearing sleeve surrounds the wire. While the sleeve may have a tab, the tab can be made uniformly small. The sleeve, which is formed of a heat shrinkable material, can be made large enough to be readily slid to any desired position. When the desired position is reached, the sleeve is heated, resulting in the sleeve shrinking and becoming locked in place. The indicia, of course, is on the portion of the piece of indicia bearing material that becomes the sleeve. Obviously, the indicia must be sized such that it will still be observable after the sleeve is shrunk.

Figure 5:
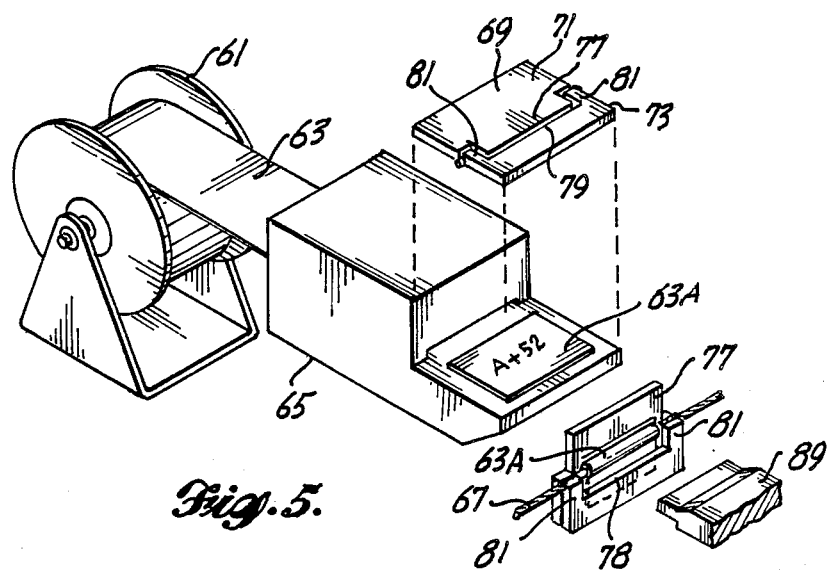
FIG. 5 is a pictorial diagram of an alternative embodiment of an apparatus formed in accordance with the invention.
Figure 11:
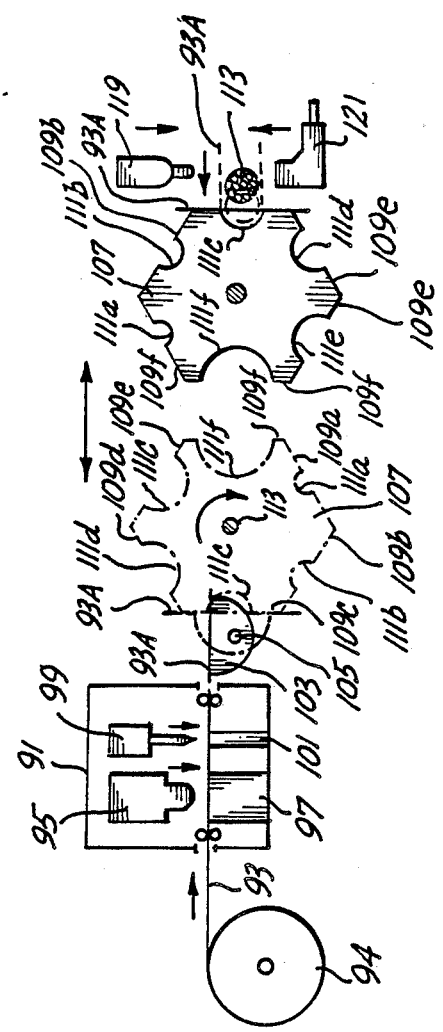
FIG. 11 is a schematic diagram of a further alternative embodiment of an apparatus formed in accordance with the invention; and, FIGS. 12A–F are sequence diagrams illustrating the operation of the embodiment of the invention illustrated in FIG. 11.
Figure 12A:
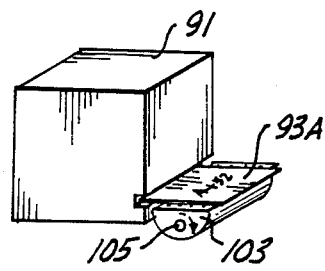
Figure 12B:
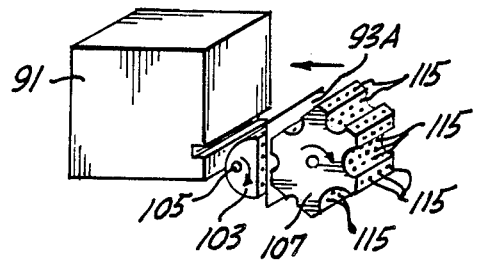
Figure 12C:
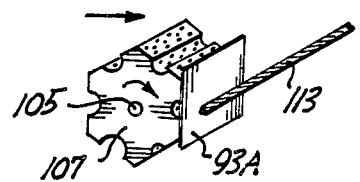
Figure 12D:
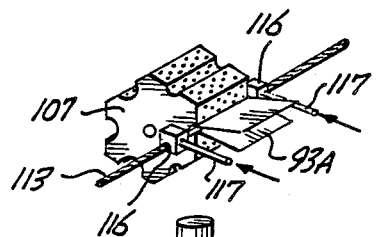
Figure 12E:
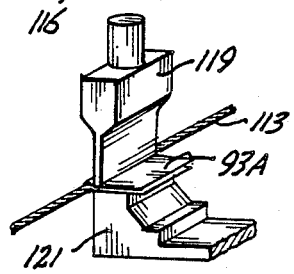
Figure 12F:
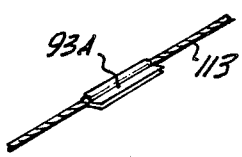

FIG. 5 is a pictorial diagram of an alternative embodiment of an apparatus formed in accordance with the invention. As with the embodiment of the invention illustrated in FIGS. 1-4, the embodiment of the invention illustrated in FIG. 5 includes a spool 61 that supplies a strip of ultrasonically weldable, heat shrinkable material 63 to a printer 65. As with the embodiment of the invention illustrated in FIGS. 1-4, the printer 65 prints indicia onto the strip of ultrasonically weldable, heat shrinkable material and severs the material to create indicia bearing pieces of material 63A. The major difference between the embodiment of the invention illustrated in FIGS. 1-4 and the embodiment of the invention illustrated in FIG. 5 relates to the pick-up mechanism for picking up a piece of indicia bearing material 63A, conveying the piece to the thin, elongate object 67 about which the piece is to be wrapped, wrapping the piece around the object into a U-shape and welding the legs of the U-shaped piece together.

As best shown in FIGS. 6-8, the pick-up mechanism of the embodiment of the invention illustrated in FIG. 5 includes a hinged pad 69 supported by a yoke 70. The yoke, and, thus, the hinged pad are moved between a pick-up position at the printer 65 and a delivery position at the object 67 by any suitable mechanism, such as an articulated arm of the type illustrated in FIG. 1.

The hinged pad 69 is in the configuration of a double leaf hinge. The hinge leaves 71 and 73 are rotatable between a common planar position and a juxtaposed position. More specifically, formed on the inner facing surfaces of the legs 72 and 74 of the yoke 70, near the outer ends thereof, are cylindrical hubs 75. The hubs form the pins for the hinge leaves 71 and 73. Formed in the outer corners of one of the edges of each of the hinge leaves 71 and 73 is a ring 76. The rings are sized to fit the hubs 75, and the hinge leaves are sized such that the rings 76 of one leaf 73 fit between the rings 76 of the other leaf 71. Finally, the hinge leaf 71 with the outer rings 76 includes a tab 77A that lies between the inner rings 76; and, the hinge leaf 73 with the inner rings has a corresponding indentation 77B. Formed in the tab on the side facing away from the yoke is a channel 79 that lies parallel to the hinge axis. The hinge axis lies in the plane defined by the bottom of the hinge leaves 71 and 73 when the hinge leaves are planar. Formed in each of the hubs 75 is a slot 80 that extends inwardly from the tips of the legs 72 and 74 of the yoke 70. The ends of the slots 80 are aligned with the channel 79.

A pair of curved springs 81A and 81B are mounted on the outer face of each of the legs 72 and 74 of the yoke 70. More specifically, each of the springs includes an arm 82A and 82B on one end that is attached to the related legs 72 and 74 by a clamp bracket 78A and 78B. The arms are located at the end of the shank of a hook-shaped section 84A and 84B. The hook-shaped sections 84A and 84B are formed and curved in a manner that creates a force designed to direct an elongate object toward the top of the slots 80 after the object enters the slots, the hinge leaves are rotated to their juxtaposed position and the cured springs are impinged on by pins 83A and 83B. More specifically, when the leaves are in their juxtaposed position, the pins 83A and 83B, which extend outwardly from the adjacent edge of the leaves 71 press the shanks of the hook-shaped sections 84A and 84B toward one another. The resultant force presses the short legs of the hook-shaped sections 84A and 84B against the elongate object, resulting in the elongate object being directed toward the top of the slot 80, as illustrated in phantom in FIG. 7B. Interference between the hook-shaped sections is avoided by bending one of the springs 81A so that the plane of the hook-shaped section 84A lies further away from the related leg 72 or 74 than the plane of the hook-shaped section 84B of the other spring 81B.

FIGS. 9 and 10 illustrate an alternative spring mechanism to the one illustrated in FIGS. 6 and 7. The spring mechanism illustrated in FIGS. 9 and 10 includes a pair of springs 85A and 85B located outside of the yoke legs 72 and 74. However, rather than being attached to the yoke legs, the springs are attached to the outer edges of the hinge leaves 71 and 73, one to each leave. Each of the springs includes a semicircular section 86A and 86B, a short arm 87A and 87B and a long arm 88A and 88B. The short arm 87A of one spring diverges radially outwardly from one end of the semicircular section 86A and the short arm 87B of the other spring diverges radially inwardly from one end of the semicircular section 86B. The long arms 88A and 88B diverge outwardly from the other ends of the semicircular sections 86A and 86B. The short arms are attached to the edges of the hinge leaves 71 and 73. When suitably positioned, the long arms 88A and 88B cross one another, with one long arm 88B lying closer to the yoke leg than the other long arm 88A. The crossed long arms define an X beneath which the elongate object lies when the hinge leaves are in their planar position (FIG. 9). As the hinge leaves move to their juxtaposed position (FIG. 10) they force the elongate object upwardly, into the slot 80. Interference between the springs is avoided by forming the springs such that the plane of the semicircular section 86A and the long arm 88A of one of the springs lies outside the plane of the other spring.

The surfaces of the hinge leaves 71 and 73 that face one another when the hinge elements are juxtaposed, include orifices (not viewable) that are connectable to a suitable vacuum source by a conduit that passes through the yoke 70. When the hinge leaves 71 and 73 are in a planar position, vacuum is being drawn and the hinged pad 69 overlies a piece of indicia bearing material 63A lying on the platform located at the outlet of the printer 65, the piece of indicia bearing material becomes attached to the hinged pad 69. The hinged pad is positioned such that the indicia on the indicia bearing piece of material faces the pad. The hinged pad is also positioned such that the longitudinal axis of the indicia lies parallel to the hinge axis of the hinged pad and along, or immediately adjacent to, the hinge axis.

After a piece of indicia bearing material becomes attached to the hinged pad, the hinged pad 69 is moved to the thin, elongate object 67 about which the piece of indicia bearing material 63A is to be wrapped. The hinged pad 69 approaches the thin, elongate object 67 such that the hinge axis of the hinged pad 69 lies parallel to the longitudinal axis of the object 67. Thus, the pad 69 is positioned such that the indicia on the piece of indicia bearing material 63A overlies the elongate object 67. Ultimately, the pad reaches a position where the thin, elongate object 67 enters the slots 80 formed in the hubs 75. Thereafter, the hinge leaves are rotated into their juxtaposed position. While this action could be accomplished manually, preferably, it is accomplished by energizing a suitable mechanism, such as a small servomotor, solenoid, or other electrical or pneumatic mechanism. In any event, as the hinge leaves are rotated into their juxtaposed position, the thin, elongate object 67 is forced to the top of the slots by the springs 81A and 81B or 85A and 85B as the piece of indicia bearing material 63A is wrapped around the object.

In addition to wrapping a piece of indicia bearing material 63A about an elongate object 67, the hinge pad 69 also forms a mandrel for an ultrasonic welding horn 89. More specifically, as noted above, one of the hinge leaves 71 of the hinged pad 69 includes a flange 77A along one edge and the facing edge of the other hinged leaf 73 includes a corresponding indentation 77B. After the hinge leaves are rotated, a portion of the protrusion 77A lies above the hinge axis and a portion lies below. The portion of the protrusion 77A that lies below the hinge axis forms the anvil for the horn 89 of an ultrasonic welding unit and the block for a knife. More specifically, after the hinge leaves 71 and 73 have been rotated to their juxtaposed positions and wrapped a piece of indicia bearing material 63A around a thin, elongate object 67, the horn 89 of the ultrasonic welding unit is moved relative to the protrusion 77A to a position where the tip of the horn 75 lies adjacent to the outwardly projecting legs of the wrapped piece of indicia bearing material 63A, between the rings 76. Thereafter, the ultrasonic welding unit is energized resulting in the outwardly extending legs of the wrapped piece of indicia bearing material 63A being welded together. Like the FIGS. 1-4 embodiment of the invention, a knife blade located immediately beneath the ultrasonic horn 89 can be actuated after the ultrasonic welding step is completed to sever the legs of the piece of indicia bearing material 63A from the sleeve of indicia bearing material that encircles the elongate object 67. Thereafter, the hinge pad 69 and the horn 89 are separated, the hinge leaves brought back to their planar position, and the hinged pad returned to a position above the print platform, ready to pick up another piece of indicia bearing material 63A.

FIGS. 11 and 12A-F illustrate another alternative embodiment of an apparatus formed in accordance with the invention. As with the embodiments of the invention illustrated in FIGS. 1-4 and 5-10, the embodiment of the invention illustrated in FIGS. 11 and 12A-F include a printer 91 that receives a strip of ultrasonically weldable, heat shrinkable material 93 from a suitable source, such as a spool 94. The printer 91 includes a print mechanism 95 and a platen 97 that cooperate to print indicia onto the strip of ultrasonically weldable heat shrinkable material 93, preferably along an axis that lies perpendicular to the longitudinal axis of the strip. After being imprinted, the printed portion of the strip of ultrasonically weldable, heat shrinkable material is moved past a knife 99 that coacts with a block 101 to sever the indicia bearing pieces of ultrasonically weldable heat shrinkable material from the strip.

After being severed, the indicia bearing pieces are ejected from the printer onto the upper surface of a vacuum holder 103 that is rotatable about an axis 105 that lies perpendicular to the movement axis of the pieces of indicia bearing material 93A ejected from the printer 91. The upper surface of the holder 103 includes a plurality of vacuum orifices that are connected to a suitable vacuum source (not shown). As a result, the pieces of indicia bearing material 93A emitted from the printer 91 become vacuum attached to the upper surface of the holder 103.

After receiving a piece of indicia bearing material 93A, the holder 103 rotates about its axis 105 and moves the piece from a horizontal position to a vertical position. The direction of rotation is away from the printer 91.

As illustrated by the dashed lines in FIG. 6, after the holder 103 rotates the piece of indicia bearing material 93A to a vertical position, a sizing wheel 107 is moved into a position to receive the piece of indicia bearing material 93A. More specifically, the sizing wheel 107 includes a plurality of flat sides 109. While the illustrated embodiment of the invention includes a sizing wheel 107 having six surfaces 109a-f, it is to be understood that this is exemplary only. Sizing wheels having two, three, four, five or more than six surfaces can be utilized, depending upon the specific requirements of a particular environment in which the invention is to be utilized. In any case, each of the surfaces 109a-f includes a longitudinal indentation 111a-f. Preferably, the cross-sectional configuration of the indentations 111a-f is semicircular. While semicircular indentations are preferred, it is to be understood that other cross-sectional configurations can be utilized, if desired. The longitudinal axis of the indentations lies parallel to the axis of rotation 112 of the sizing wheel 107. Further, the axis of rotation of the sizing wheel 107 lies parallel to the axis of rotation 105 of the holder 103.

Prior to being juxtaposed against the piece of indicia bearing material 93A held by the holder 103 after the holder rotates the piece of indicia bearing material 93A to a vertical position, the sizing wheel 107 is rotated until the base 109c having an indentation 111c slightly larger than the diameter of the elongate object 113 that is to ultimately be encircled by the piece of indicia bearing material faces the piece of indicia bearing material held by the holder 103. After the sizing wheel has been rotated to the desired position, it is moved toward the holder 103 until the facing surface 109c of the sizing wheel 107 lies adjacent to the piece of indicia bearing material 93A. When this occurs, vacuum is drawn through orifices 115 formed in the surface 109c and the indentation 111c of the facing side of the sizing wheel 107. Thereafter, vacuum is cut off from the orifices in the holder 103. As a result, the piece of indicia bearing material 93A is transferred from the holder 103 to the sizing wheel 107. The positioning of the piece of indicia bearing material is such that the indicia faces the indentation 111c and lies parallel to the longitudinal axis of the indentation. After the sizing wheel 107 receives the piece of indicia bearing material, the sizing wheel 107 moves away from the holder 103 and the holder returns to its horizontal position.

After receiving a piece of indicia bearing material 93A, the sizing wheel 107 is moved by a suitable mechanism to a position adjacent the elongate object 113 that is to receive the piece of indicia bearing material 93A. While various mechanisms for supporting the sizing wheel can be used, one suitable mechanism is an articulated arm of the type illustrated in FIG. 1 combined with a yoke of the type illustrated in FIG. 6 for supporting the sizing wheel. Regardless of the nature of the movement mechanism, as the sizing wheel is being moved, or before or after being moved, the wheel is rotated so that the piece of indicia bearing material 93A faces the thin, elongate object 113 that is to receive the piece. The final position of the sizing wheel 107, with respect to the thin, elongate object 113, is such that the longitudinal axis of the thin, elongate object 113 is aligned with the longitudinal axis of the semicircular indentation 111c formed in the side 109c of the wheel 107 that holds the piece of indicia bearing material 93A.

After the sizing wheel is positioned with respect to the thin, elongate object 113, the sizing wheel 107 and the object 113 are moved relative to one another such that the object 113 presses the piece of indicia bearing material 93A into the semicircular indentation 111c. This may be accomplished by moving the object 113 toward the sizing wheel, the sizing wheel 107 toward the object, or both toward each other. As illustrated in FIG. 10D, if the object is a relatively flexible object, such as a copper wire, the object may be held at either end of the semicircular indentation 111c by stiffening members, which may be formed by clamps 116 mounted on the ends of support rods 117. When the elongate object 113 is pressed into the semicircular indentation 111c, the piece of indicia bearing material 93A wraps around the object 113. Thus, the piece of indicia bearing material 93A becomes U-shaped. Next, an ultrasonic welding mechanism formed by an anvil 119 located on one side of the outwardly extending legs of the U-shaped piece of indicia bearing material 93A, and an ultrasonic welding unit 121 located on the other side of the outwardly extending legs are moved toward one another into a welding position adjacent to the thin, elongate object 113. After the anvil 119 and the ultrasonic welding unit 121 are moved into their welding positions, the ultrasonic welding unit is energized. As a result, the ultrasonic horn of the ultrasonic welding unit emits ultrasonic energy. Thus, the legs of the piece of indicia bearing material 93A are welded together. Thereafter, the excess portions of the legs of the piece of indicia bearing material 93A are removed. The excess leg portions may be removed by a knife located adjacent to the horn of the ultrasonic welding unit, on the side remote from the thin, elongate object. As a result, the elongate object 113 is encircled by a cylinder of indicia bearing material. As with the other embodiments of the invention, initially, the cylinder of indicia bearing material is loose and can be slid into any desired position along the length of the thin, elongate object 113. After the desired position is reached, the cylinder of indicia bearing material can be fixed in place by applying heat to the cylinder adequate to activate the heat shrinking feature of the material.

As will be readily appreciated from the foregoing description, the invention provides a method and apparatus for creating an identification sleeve on a thin, elongate object, such as a wire, pipe or tube. The method of the invention involves the steps of: (1) printing identification indicia on a strip of ultrasonically weldable, heat shrinkable materal; (2) cutting the strip into flat pieces, each of which contain identification indicia in a predetermined location; (3) wrapping the pieces around the elongate object into a U-shap with the piece oriented such that the indicia lies along the axis of the object; (4) ultrasonically welding the outwardly extending legs of the U-shaped pieces together adjacent the object; and, (5) removing excess portions of the legs. After the thusly formed sleeve is positioned, the sleeve is heated to cause the sleeve material to shrink until the sleeve tightly grips the object.

It will be appreciated that identification sleeves formed in accordance with a method and apparatus of the invention overcome the disadvantages of prior indicia applying methods and apparatus. Since the indicia are printed, they can be readily observed under low-light conditions. Further, because the indicia are printed when the pieces are flat, no difficult print problems arise. Because the sleeve is wrapped around thin, elongate objects, the objects can be noncylindrical. This allows the invention to provide easily readable indicia on twisted wire pairs, as well as on single wires. Also, because the cylindrical sleeve is formed by wrapping around the object rather than applied as a preformed cylinder, the sleeve can be readily placed anywhere along the length of the object. This feature also makes the invention useful on continous, elongate objects, such as rings, for example. Further, because the outwardly extending legs are removed and because the resulting cylinder is heat shrinkable, an identification sleeve formed in accordance with the invention does not create a large protrusion that prevents elongate objects from being pulled through relatively small openings.

While preferred embodiments of the invention have been illustrated and described, it is to be understood that within the scope of the appended claims various changes can be made therein. For example, rather than using articulated arms to move the vacuum pads that pick up the imprinted pieces of indicia bearing material, other movement mechanisms can be used. Also, the elongate object to receive the piece of indicia can be moved as well as the vacuum pad. Further, the various embodiments can apply the tags to differently oriented thin, elongate objects. For example, the object can be vertically, rather than horizontally, oriented. Also, the indicia can be created in some way other than printing. For example, indicia can be embossed into the pieces of indicia bearing material. Moreover, while heat shrinkable material is preferred, if heat shrink capability is not needed or desired, weldable materials that are not heat shrinkable can be used. Finally, the vacuum pads, the ultrasonic welding unit and the anvil could be packaged in a hand held device designed to pick up the indicia bearing labels from a printer tray and apply them to an elongate object. Hence, the invention can be practiced otherwise than as specifically described herein.

What is claimed is:

1. A method of creating an identification sleeve on a thin, elongate object of indeterminate length comprising the steps of:
creating individual flat peices of ultrasonically weldable material bearing identification indicia;
picking up said individual flat indicia bearing peices of material one at a time;

moving said indicia bearing pieces of material one-at-a-time to a position overlying a thin, elongate object to be identified;

wrapping said indicia bearing pieces of ultrasonically weldable material around said thin, elongate object to be identified such that each piece takes on a U-shape and such that the indicia and the object are aligned and the indicia overlies the object;

ultrasonically welding the outwardly extending legs of each U-shaped piece of ultrasonically weldable material together in the region adjacent to the object to create a cylinder surrounding said thin, elongate object; and, removing the portion of the legs of the U-shaped piece lying on the side of the weld remote from said thin, elongate object.

2. The method claimed in claim 1 wherein said pieces of ultrasonically weldable material are also heat shrinkable.

3. The method claimed in claim 2 wherein said indicia is created by printing identification indicia on said flat pieces of ultrasonically weldable, heat shrinkable material.

4. The method claimed in claim 2 including the steps of:

positioning the cylinder of ultrasonically weldable, heat shrinkable material in a predetermined position along the length of the thin, elongate object after the excess portion of the legs are removed; and, heating the cylinder of ultrasonically weldable, heat shrinkable material after it has been positioned to activate the heat shrinking feature of said piece of ultrasonically weldable, heat shrinkable material.

5. The method claimed in claim 4 wherein said indicia is created by printing identification indicia on said flat pieces of ultrasonically weldable, heat shrinkable material.

* * * * *